(12) United States Patent
Inscho, Jr.

(10) Patent No.: US 10,881,115 B1
(45) Date of Patent: Jan. 5, 2021

(54) AUTOMATED POULTRY ORIENTATION AND SHACKLING SYSTEM

(71) Applicant: James Ronald Inscho, Jr., Birmingham, AL (US)

(72) Inventor: James Ronald Inscho, Jr., Birmingham, AL (US)

( * ) Notice: Subject to any disclaimer, the term of this patent is extended or adjusted under 35 U.S.C. 154(b) by 0 days.

(21) Appl. No.: 16/997,564

(22) Filed: Aug. 19, 2020

Related U.S. Application Data

(60) Provisional application No. 62/888,952, filed on Aug. 19, 2019.

(51) Int. Cl.
*A22C 21/00* (2006.01)

(52) U.S. Cl.
CPC ...... *A22C 21/0053* (2013.01); *A22C 21/0007* (2013.01)

(58) Field of Classification Search
CPC ... A22C 21/00; A22C 21/053; A22C 21/0069; A22C 21/02; A22C 21/022; A22C 21/06
USPC ........................................ 452/177, 183, 184
See application file for complete search history.

(56) References Cited

U.S. PATENT DOCUMENTS

| | | | | |
|---|---|---|---|---|
| 5,324,228 A | * | 6/1994 | Vogeley, Jr. | ....... A22C 17/0086 452/150 |
| 5,352,153 A | * | 10/1994 | Burch | ..................... A22B 5/007 452/157 |
| RE36,664 E | * | 4/2000 | O'Brien | ............... A22B 5/0005 452/149 |
| 6,623,346 B2 | | 9/2003 | Lee | |
| 7,134,956 B2 | | 11/2006 | Lee | |
| 7,226,349 B2 | | 6/2007 | Berry | |
| 8,562,397 B1 | | 10/2013 | Palmateer et al. | |
| 8,657,102 B2 | | 2/2014 | Krebs | |
| 9,155,315 B2 | | 10/2015 | Ostergaard | |
| 9,179,684 B2 | | 11/2015 | Van Stuyvenberg et al. | |
| 9,907,315 B2 | | 3/2018 | Harben | |
| 10,159,259 B2 | | 12/2018 | Ostergaard et al. | |
| 2008/0200107 A1 | * | 8/2008 | Christensen | ........... A22B 5/007 452/157 |
| 2009/0124186 A1 | * | 5/2009 | Klein | ........................ A22B 5/20 452/152 |
| 2010/0190426 A1 | | 7/2010 | Lee et al. | |
| 2011/0275296 A1 | * | 11/2011 | Wally | .................... A22C 15/001 452/32 |
| 2012/0040597 A1 | * | 2/2012 | Fern | ........................ A22C 17/02 452/156 |
| 2012/0315834 A1 | * | 12/2012 | Van Der Steen | ...... A22B 7/002 452/125 |

* cited by examiner

*Primary Examiner* — Richard T Price, Jr.
(74) *Attorney, Agent, or Firm* — Christopher R. Ganter, LLC; Christopher R. Ganter

(57) ABSTRACT

An automated poultry orientation and shackling system comprising an orienting system, an orientation determination system, a pass fail system and a poultry shackling system whereby poultry is robotically inserted into a poultry shackle using a plurality of vision guided robots in series and a unique tool that has a three axis capability of rotation and a contour to match the contour of a poultry breast.

18 Claims, 8 Drawing Sheets

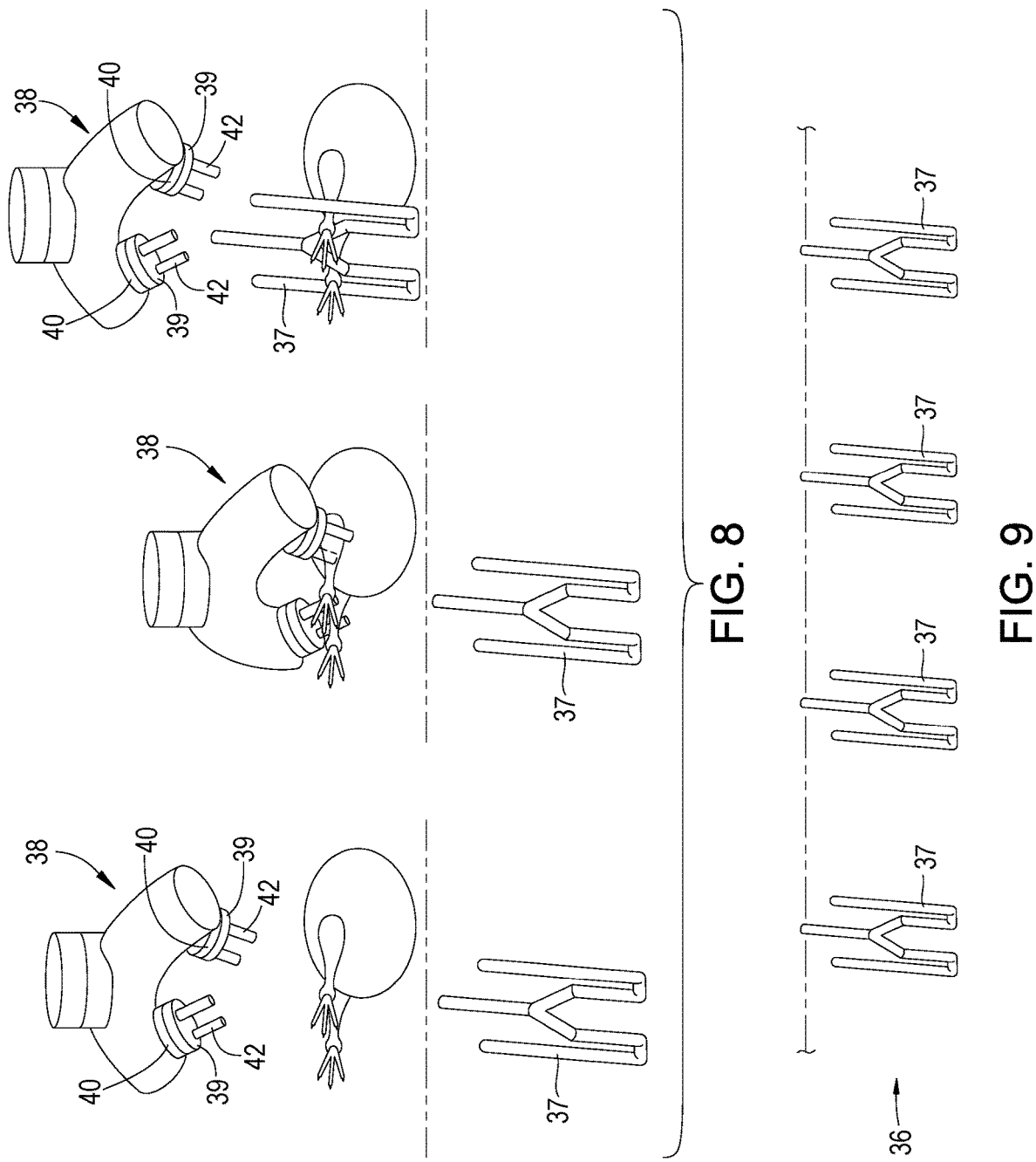

AUTOMATED POULTRY ORIENTATION AND SHACKLING SYSTEM

CROSS-REFERENCED TO RELATED APPLICATIONS

This application claims the benefit of U.S. Provisional Application No. 62/888,952 filed Aug. 19, 2019 in its entirety.

FEDERALLY SPONSORED RESEARCH

None

SEQUENCE LISTING

None

FIELD OF THE INVENTION

The present invention relates to an automated system for orienting and shackling poultry units that are being processed for consumption.

BACKGROUND OF THE INVENTION

Traditionally, poultry has been processed by hand via human workers. Modern advancements in automated systems have cut down on the need for human workers to perform particular tasks in various steps of the poultry process. However, the shackling process whereby a bird is hung by their legs on a shackle before they are processed is still entirely performed by human workers. This particular work is not desirable to certain persons and process facilities often have a hard time retaining workers to perform this task and turnover numbers are quite high in the workforce. What is needed in the art is an automated system that reduces the need for human workers. Further, what is needed in the art is an automated system that provides for minimal robotic movement to achieve the shackling step of a bird.

SUMMARY

The shackling system and apparatus is comprised of either a robotic based orienting system or a buoyancy orienting system, a poultry orientation determining system, a pass/fail orientation system, and a robotic direct shackling system. The present system has been developed for use in existing poultry process plants to accommodate the spatial availability in pre-existing plants. The amount of space available in an individual processing plant will dictate whether a robotic based orienting system or a buoyancy orienting system will be employed. Further, if a buoyancy orienting system is chosen, special requirements in a facility may dictate how the buoyancy system is configured If less linear space is present, a gravity orienting system will be employed as its footprint is smaller than a buoyancy orienting system.

BRIEF DESCRIPTION OF THE DRAWINGS

FIG. 8 is a perspective view of a poultry on a shackle conveyor and proceeding to be installed into a shackle via the shackle tool.

FIG. 9 is a perspective view of a shackle line.

DETAILED DESCRIPTION

Figure 1:
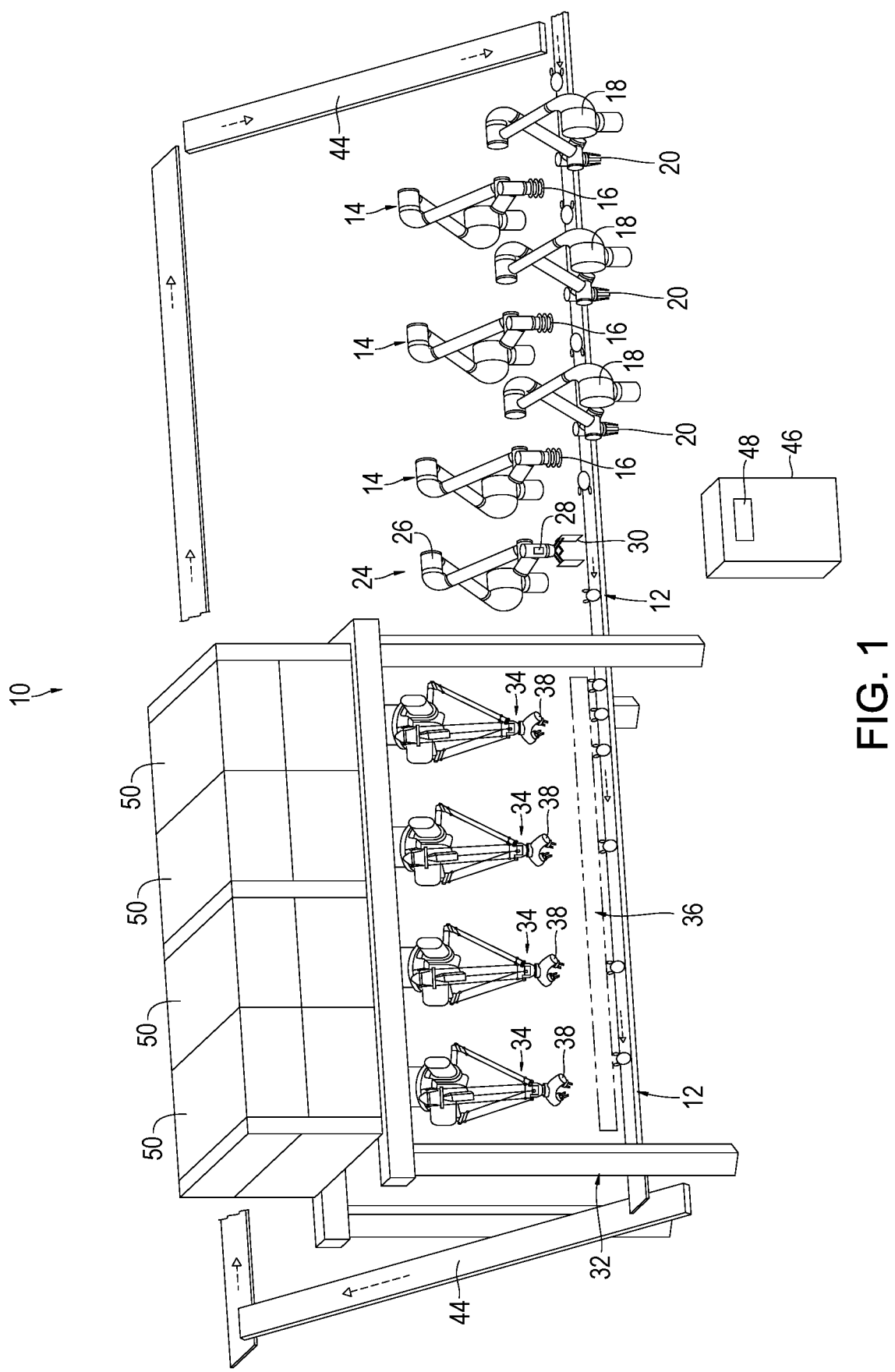
FIG. 1 is a perspective view of the automated poultry orienting and shackling system with a robotic based orienting system.
Figure 2:
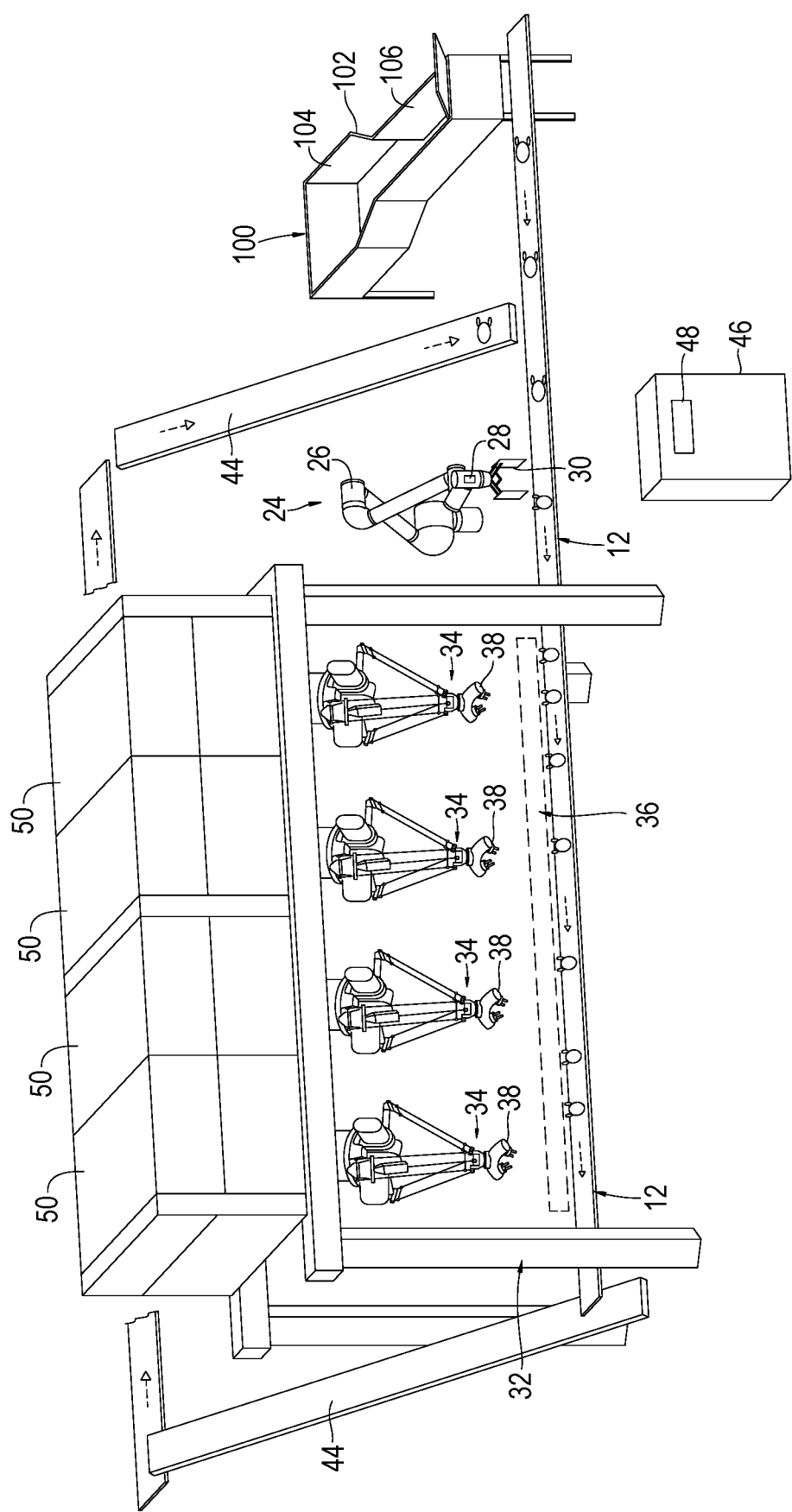
FIG. 2 is a perspective view of the automated poultry orienting and shackling system with a buoyancy orienting system.
Figure 3:
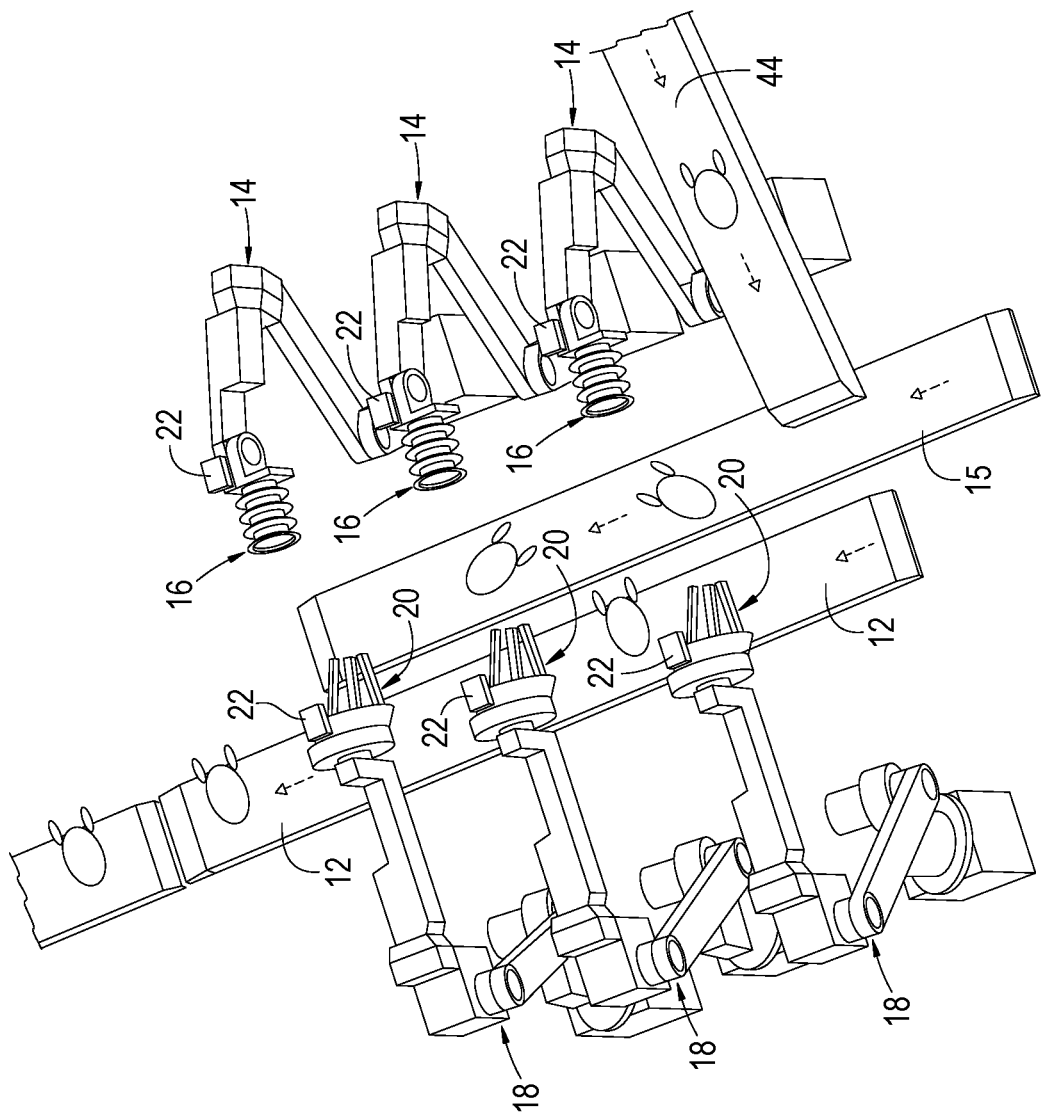
FIG. 3 is a perspective view of the robotic based orienting system isolated from the automated poultry orienting and shackling system.
Figure 4:
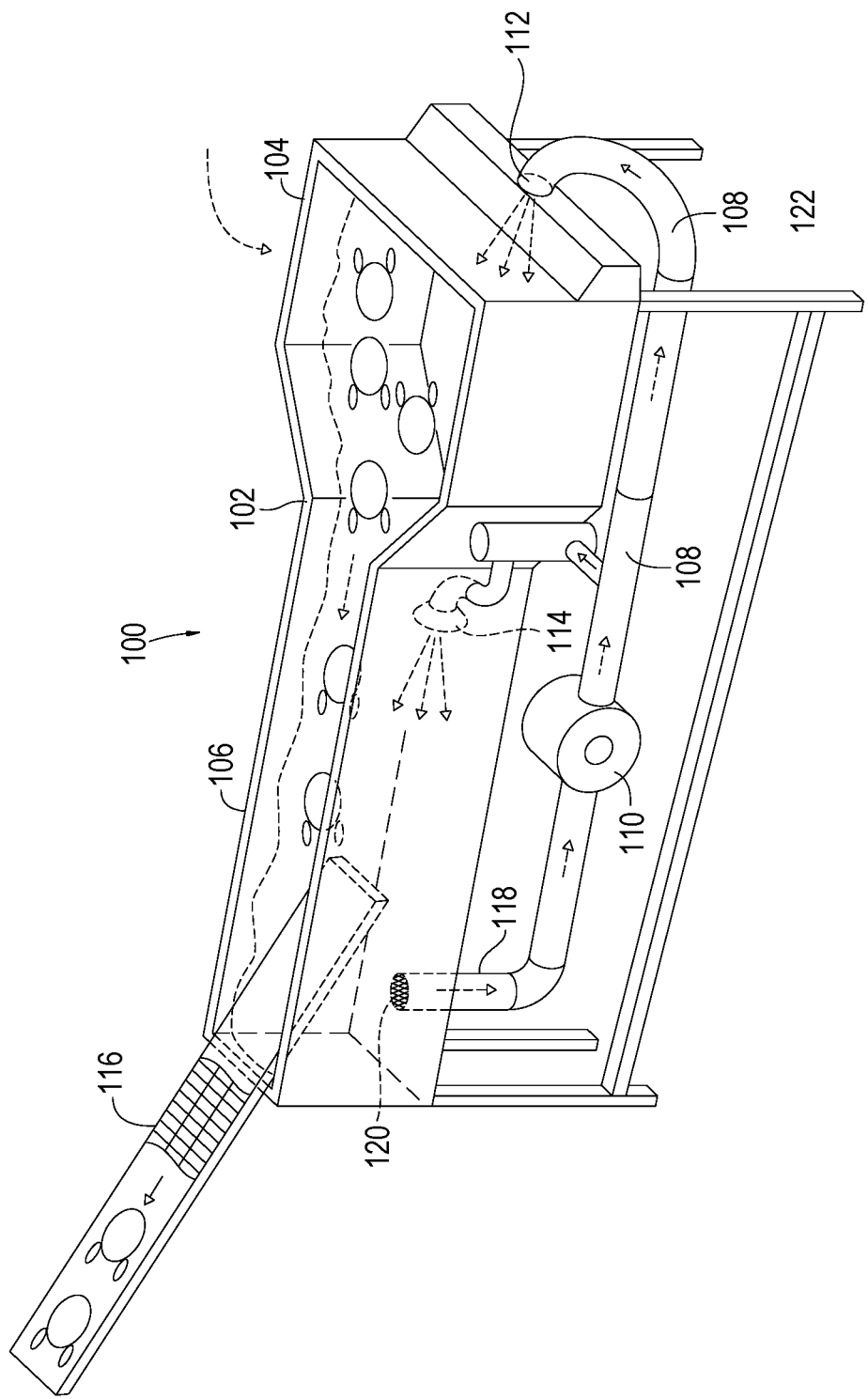
FIG. 4 is a perspective view of the buoyancy orienting system isolated from automated poultry orienting and shackling system.
Figure 5:
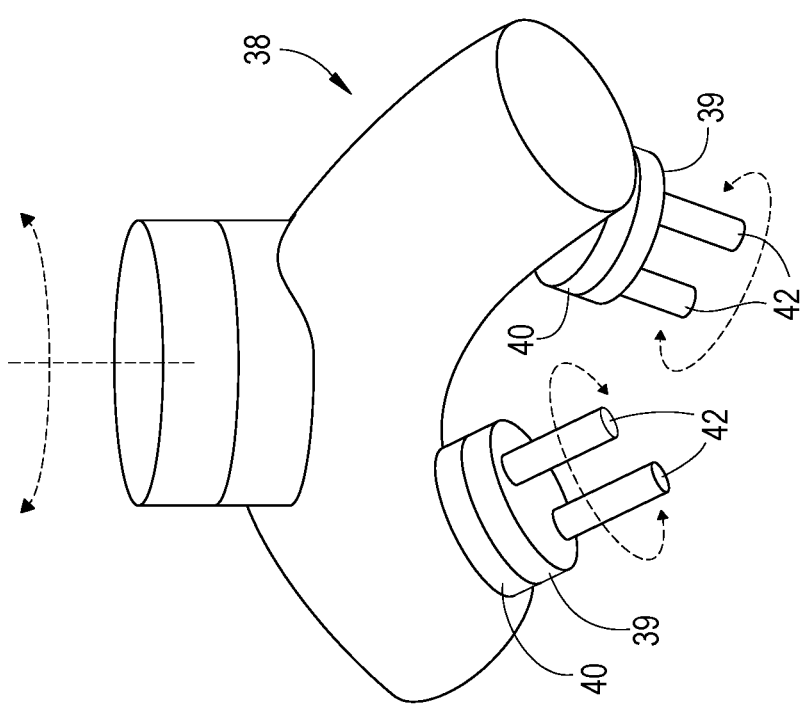
FIG. 5 is a perspective view of the shackling tool used to shackle poultry onto a shackle line.

Referring now to FIGS. 1-2 there is shown two embodiments of an automated poultry orienting and shackling system. FIG. 1 shows the automated poultry orienting and shackling system 10 with a robotic based orienting system whereas FIG. 2 shows the automated poultry orienting and shackling system 10 with a buoyancy orienting system. The choice between a robotic based orientation system and a buoyancy orientation system would be made according to spatial requirements in a chicken process facility. Currently, poultry are chilled in a liquid bath also containing anti-pathogenic chemicals to reduce bacteria and viruses. Once chilled, the poultry are put on shackle line whereby human workers shackle the poultry on a shackle line which are common in the industry. The automated poultry orientation and shackling system 10 allows this step in the poultry process to become fully automated. FIG. 1 shows a shackle conveyor 12 and three pick robots 14 having a suction tool 16 and three directly opposed place robots 18 having a prong tool 20. It is necessary to have enough pick robots 14 and place robots 18 to allow for quick picking and placing of poultry to meet industry standards. Poultry is deposited onto the shackle conveyor 12 in large clumps of 30 to 40 poultry units at a time. The pick robots 14 each have a vision camera 22 whereby said vision camera is pre-programmed to assess the topography of the pile of poultry and plots a target poultry based on a topographical mapping from the imaging by said vision camera 22. Once a target poultry is picked from the pile the vision camera 22 reimages and selects targets until the shackle belt 12 is clear of poultry. The pick robots 14 engages the poultry using the suction tool 16 to lift the poultry off of a feed conveyor 15 as shown in FIG. 3. The pick robots 14 also have pre-programmed logic to identify zones where they can pick up a poultry or to abstain and let a subsequent downstream robot pick up the poultry. The pick robot 14 then partially rotates the poultry into a proper shackling position and hands the poultry off to an opposing place robot 18 that receives the poultry by grasping it with its prong tool 18. The place robots 18 then through use of their six axis of rotation rotates and places the poultry onto the shackle conveyor 12 in a position such that the length of the poultry is perpendicular to the travel direction of the shackle conveyor 12 with the poultry legs facing away from the place robots 18 and directly adjacent to an eventual shackle line 36. The place robots 18 also have pre-programmed logic to identify zones where they can receive a poultry from a pick robot 14 or to abstain and let a subsequent downstream place robot receive and place the poultry.

Referring now to FIGS. 2, 4, 6-7 there is shown a buoyancy orientation system 100 having a flume 102 with a flared wide end 104 where poultry is introduced and a narrow channel 106 whereby poultry is oriented and fed to an orientation determination system 200. The flume 102 is a supported by a frame 122. In operation the flume 102 is filled with water and a pumping system having a pump 110 forces water through a supply pipe 108 out of a low velocity high volume nozzle 112 in the bottom of and in the back edge of the flared wide end 104 of the flume and also the pump 110 forces water out of a high velocity low volume laminar nozzles 114 and into the narrow channel 106 of the flume 102. When poultry are introduced into the flared wide end 104 of the flume 102, their natural buoyancy and center of mass causes the poultry to float chest up. The low velocity high volume nozzle 114 allows the poultry to be gently agitated until they turn breast side up. The narrow channel 106 of the flume is narrow enough that the poultry have to be facing either head first or legs first in single file formation such that their length is parallel to the length of the narrow flume 106. The return 118 recirculates the water through the pump 110 and this additionally helps pull the poultry through the flume 102. The poultry advance towards a wire mesh style conveyor 116 and are conveyed out of the flume 102 and deposited onto a first delivery conveyor 202 of an orientation determination system 200. The wire mesh style conveyor 116 aids the poultry in shedding any excess water on them back into the flume 102 such that water does not interfere with remaining conveyors a poultry will travel on its way to a shackle line 36. There is also shown a strainer 120 in the bottom of the flume 102 that strains any poultry fragments that may have become dislodged from the poultry in the flume 102.

Figure 6:
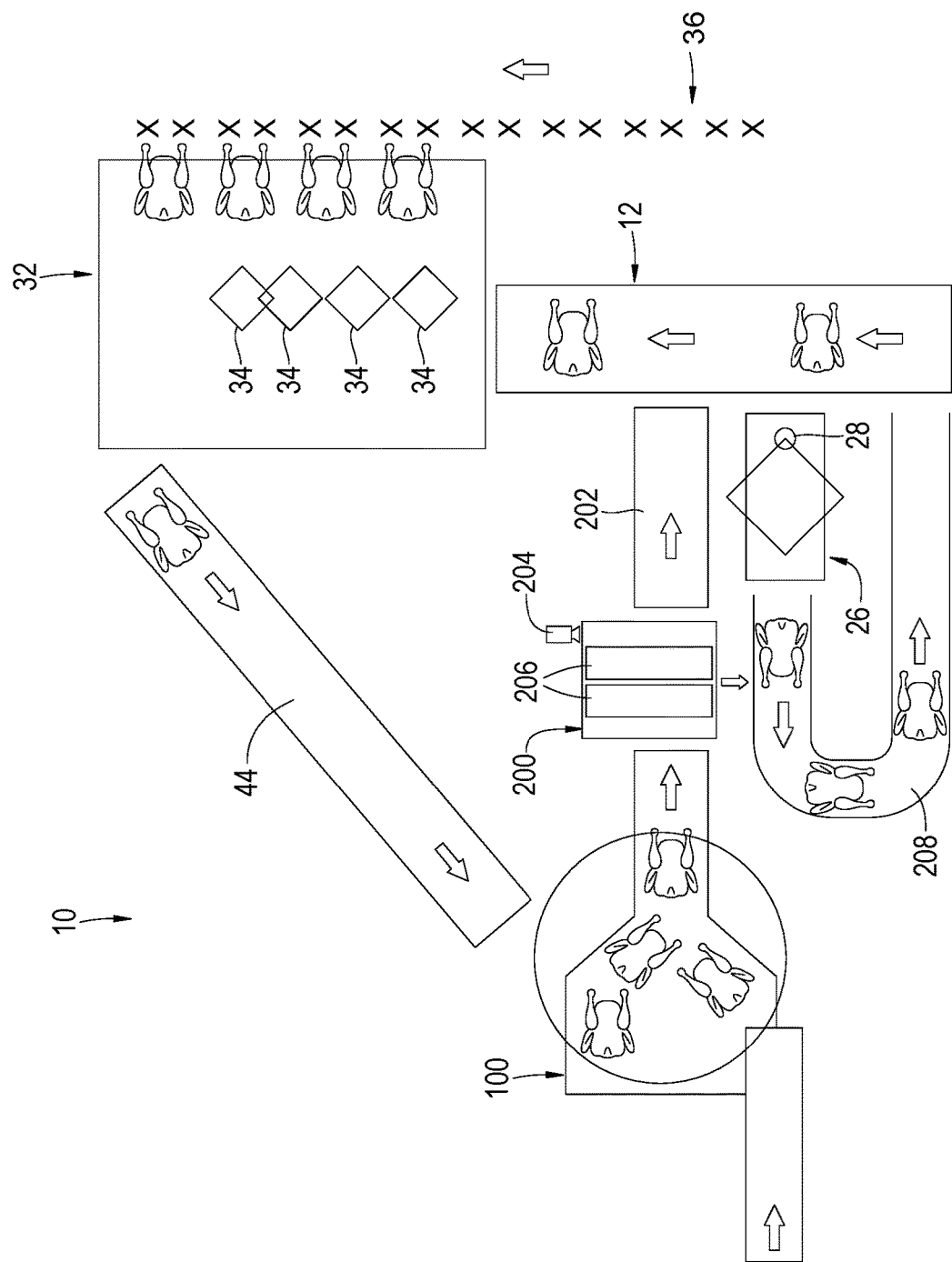
FIG. 6 is a top plan view of one embodiment of the orientation determination system used with the buoyancy orienting system.

Referring now to FIG. 6, there is shown one embodiment of an orientation determination system 200 whereby the poultry is introduced perpendicular to a shackle conveyor 12. This configuration is favorable for an available space in chicken processing plant that is substantially square in shape as opposed to a facility that has a longer narrow space available. The embodiment of the orientation determination system shown in FIG. 7 has the flume 102 of the buoyancy orientation system 100 parallel to the shackle conveyor. Referring to FIG. 6, a poultry is deposited onto transfer conveyor 206 whereby a determiner camera 204 using tracking software determines whether a poultry is legs first or head first. If the poultry is legs first, the transfer conveyor 206 transfers the poultry onto a first delivery conveyor 102 that directly deposits the poultry onto a shackle conveyor 12 such that the poultry enters the shackle conveyor 12 legs first and perpendicular to the direction of travel of the shackle conveyor 12. If the determiner camera 204 determines that the poultry is head first on the transfer conveyor 206, the transfer conveyor 206 upon given an output provided by the program logic control will transfer the poultry across the transfer conveyor 206 via small belt conveyors and onto a second delivery conveyor 208 whereby the second delivery conveyor 208 makes a 180 degree turn such that the poultry enters the shackle conveyor 12 in a legs first position onto the shackle conveyor 12 such that the poultry is perpendicular to the direction of travel of shackle conveyor 12.

Figure 7:
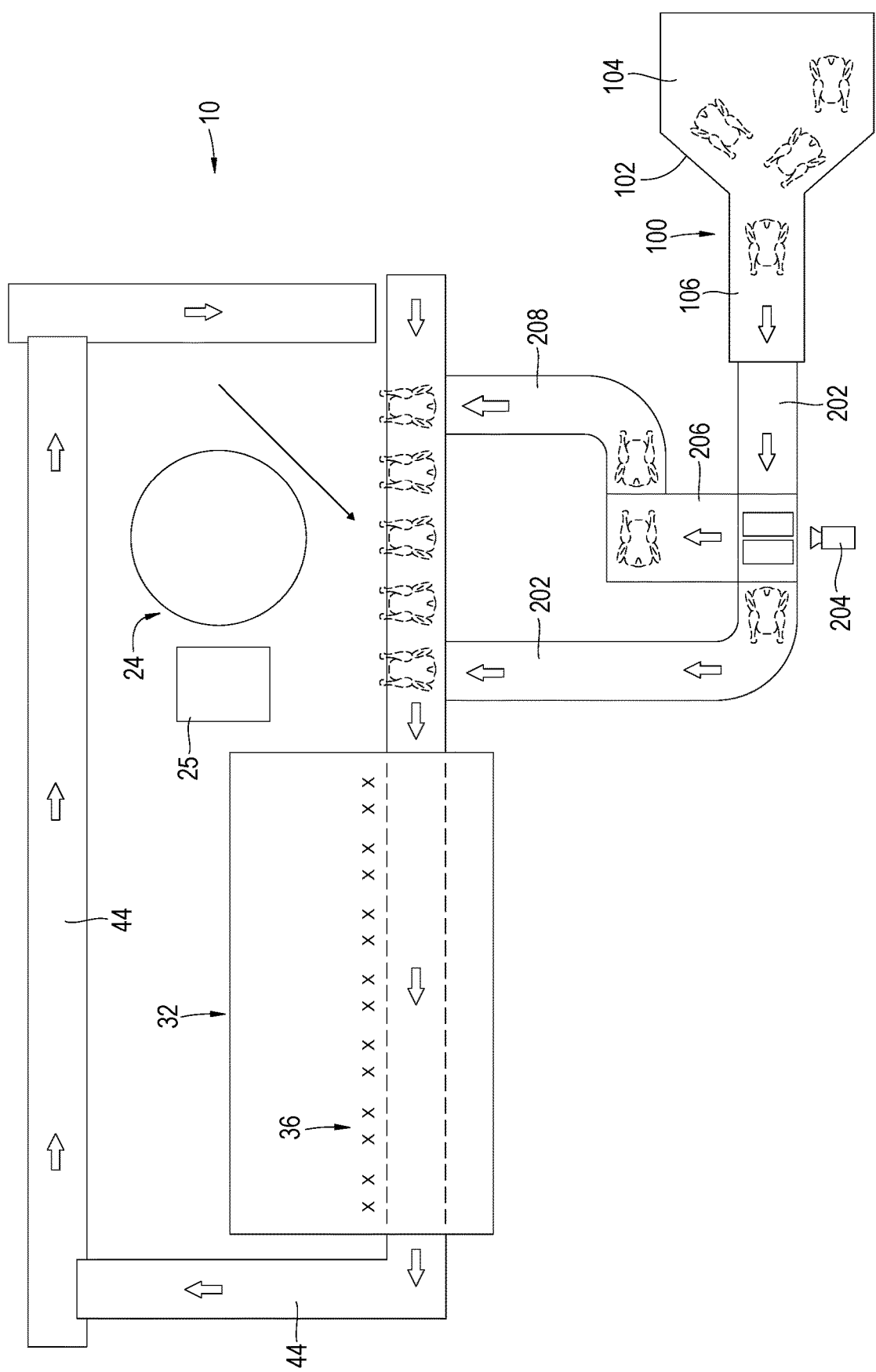
FIG. 7 is a top plan view of an alternate embodiment of the orientation determination system used with the buoyancy orienting system.

Referring to FIG. 7 there is shown an alternate embodiment of the orientation determination system 200 whereby the flume 102 is parallel and offset from the shackle conveyor 12. The poultry is advanced from the wire style exit conveyor 116 onto a first delivery conveyor 202 that carries the poultry to a transfer conveyor 206 whereby the determiner camera 204 determines if the bird is legs first or heads first. If the poultry is legs first, the poultry continues on the first delivery conveyor 202 whereby it is deposited onto the shackle conveyor 12 legs first such that said poultry is perpendicular to the direction of travel of the shackle conveyor 12. If the determiner camera 204 determines that the poultry is head first on the transfer conveyor 206, the transfer conveyor 206 will transfer the poultry across the transfer conveyor 206 via small belt conveyors and onto a second delivery conveyor 208 whereby the second delivery conveyor 208 makes a 90 degree turn such that the poultry enters the shackle conveyor 12 in a legs first position onto the shackle conveyor 12 such that the poultry is perpendicular to the direction of travel of shackle conveyor 12.

Once a poultry is deposited onto the shackle conveyor 12 as shown in FIGS. 1-2 and 6-7, they advance downstream on the shackle conveyor 12 whereby it will encounter a pass/fail orientation system 24 comprised of a vision guided robot 26 having a paddle gripper 30 tool. The vision guided robot is a six axis of rotation robot that analyzes the poultry position and can remove a poultry from the shackler conveyor if there is a deformity deposit a rejected poultry into a discard bin 25, rotate a poultry to a desired position on the shackler conveyor such that the poultry legs will be closest to a downstream shackle line, or allow a poultry to pass untouched without a robotic action by said vision guided robot. The vision guided robot 26 uses three software tools in the vision logic to perform these functions. The software tools will score the poultry by shape and if the score of the poultry shape is below a pre-set threshold, the vision guided robot 26 receives a reject signal as reject input which the reject input initiates a subroutine during which the vision guided robot 26 will remove the poultry into the discard bin 25. If the poultry meets the shape tool threshold but not an orientation threshold tool, an orientation output assigning a tool offset is sent to the robot 26 and the robot 26 runs a subroutine that incorporates the offset to align the poultry using the paddle gripper 30 tool. If the poultry meets both the shape and orientation tools then no output is sent to the robot 26 and the poultry continues to the shackling line.

Once a poultry passes through the pass fail orientation system it will enter the shackler frame 32 as shown in FIGS. 1-2. The shackler frame 32 houses the shackle line 36 and the adjacent shackle conveyor 12. The shackle line 36 is directly adjacent to the shackle conveyor 12 and is in vertical orientation and perpendicular to the shackle conveyor 12. Mounted to the bottom of the shackler frame roof are three or more vision guided shackling robots 34 that are in series and are suspended directly above the shackle line 32 and the shackling conveyor 12. Located on top of the shackler frame 32 are respective robot control units 50 that link up with a program logic control 46 so that control each of said vision guided robots 34 is synchronized with the other system components and sub-systems as described above. The shackling robots 34 use pre-programmed vision images and logic to assess a bird so as to approach the poultry, engage the poultry with a unique shackling tool 38 that is contoured to the curvature of a poultry breast, and allows the shackle robot 34 to lift, pull and guide the legs of the poultry in the moving shackle line 36 such that the poultry leg is adequately inserted into the shackle 37 and the lower poultry knuckle is lodged behind the shackle 37. The shackle robots 34 have pre-defined zones of shackling and if poultry is not in one of those zones at the time a shackling robot 34 is available to pick the poultry, the control unit 50 of the shackle robot 34 will make the decision to not shackle the poultry and allow a downstream shackling robot 34 to shackle the poultry.

The shackling tool 38 is connected to the shackling robot 34 faceplate whereby the faceplate is servo motor driven and provides a first axis of rotation such that the tool 38 can be rotated 360 degrees. The shackling tool in one embodiment is contoured approximately 33 degrees below the faceplate on either of the tools 38 terminal ends to effectively pick a five pound poultry. Different contour angles would be needed for different size poultry. Each terminal end of said shackling tool 38 has a servo driven motor 40 that is connected to a cylindrical body 39 and projecting out of the cylindrical body are a plurality of parallel soft grippers 42. The parallel soft grippers 42 are designed to be placed over the meaty portion of a poultry lower leg and pins the legs between the soft grippers 42 and said servo motors 40 are rotated in an appropriate direction to get the poultry legs parallel such that said legs of the poultry can be inserted into the shackle 37. In natural position, a poultry leg's are not parallel to each other but are angled towards each other. It is this problem the shackling tool 38 solves by quickly recognizing the poultry's position using said vision guided robot and pre-programmed logic control to acquire an image of the present poultry and to appropriately rotate the entire shackling tool 38 to an appropriate position to nest on top of the poultry and rotating the shackling tool 38 servo motors 40 an appropriate degree of rotation to get the legs parallel. The shackling robots 34 rear two delta arms lift up causing the poultry legs to advance toward and up to the shackle line 36 whereby they inserted into the claws of the shackle 37. The robotic shackling system can shackle anywhere from 140 to 175 poultry per minute. As poultry is shackled and advanced down the shackle conveyor 12 the shackle conveyor 12 starts to slope downward at a 5 degree angle until the birds are gently lifted by the shackle line 36 which is at a static height. Any poultry not shackled by the shackling robots 34 continues down the shackle conveyor 12 and are deposited onto a recycle conveyor 44 which recycles the birds onto the beginning of the shackle conveyor 12 so that they can be eventually shackled by the shackling robots 34. In one embodiment, the shackle conveyor can be one continuous loop such that a properly oriented poultry that does not get shackled get does not have to be reoriented by the pass fail vision guided robot 26. Further, various types of motor driven belt conveyors and/or roller conveyors as are standard in the industry can be used.

Further shown is the program logic control 46 and a human user interface 48 whereby programming and logic within the various subsystems can be entered.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

ELEMENTS

10 Automated poultry orienting and shackling system
12 Shackle conveyor
13 Robotic orientation system
14 Pick robot
15 Feed conveyor
16 Suction Tool
18 Place robot
20 Prong tool
22 Camera
24 Pass fail orientation system
25 Discard bin
26 Vision guided robot
28 Vision camera
30 Paddle Gripper
32 Shackler frame
34 Shackling robots
36 Shackle line
37 Shackle
38 Shackle tool
39 Cylindrical body
40 Servo motor
42 Soft grippers
44 Recycle Conveyor
46 Program logic control
48 Human Interface
50 Robot control units
100 Buoyancy orientation system
102 Flume
104 Flared wide end
106 Narrow channel
108 Supply pipe
110 Pump
112 Low velocity high volume nozzle
114 High velocity low volume laminar nozzles
116 Wire style exit conveyor
118 Return
120 Strainer
122 Frame
200 Orientation determination system
202 first delivery conveyor
204 Determiner camera
206 Transfer conveyor
208 Second delivery conveyor

What I claim is:

1. An automated poultry orienting and shackling system, comprising:

a robotic orientation system further comprising a plurality of pick robots positioned directly adjacent to a feed conveyor and a plurality of place robots directly opposed to said pick robots whereby said place robots are adjacent to a shackle conveyor whereby said shackle conveyor is directly adjacent and parallel to said feed conveyor;

a camera and pre-programmed vision logic located on said pick robots and on said place robots whereby said pick robots guided by said pre-programmed logic and a picture of a poultry unit presented to said pick robot will pick up a poultry off of the feed conveyor, rotate the poultry to a position whereby the poultry is breast up whereby said pick robot passes the poultry off to an adjacent place robot which receives the poultry and further rotates said poultry via said camera and said pre-programmed logic such that the poultry is breast up on the shackler conveyer and perpendicular to the shackler conveyor whereby the legs of the poultry are pointed away from the place robot;

a pass fail orientation system comprised of a vision guided robot that can remove a poultry from the shackler conveyor, rotate a poultry to a desired position on the shackler conveyor, or allow a poultry to pass without a robotic action by said vision guided robot;
a shackler frame having a plurality of overhead mounted vision guided shackling robots mounted in series above the shackler conveyor and a shackle line that is perpendicular to and directly adjacent to the shackle conveyor;
a shackling tool connected to the face plate of each of said shackling robots whereby said tool is contoured to a poultry breast and has a servo motor central axis of rotation and a first servo motor on one terminal end of the tool connected to a cylindrical body that is attached to a plurality of soft grippers and a second servo motor connected to a cylindrical bod attached to a plurality of soft grippers on the opposite terminal end of the shackling tool whereby said shackling tool is vision guided by the shackling robot;
a program logic control system that controls said pick robots, place robots, feed conveyor, shackle conveyor, shackler line, shackling robots and shackling tool and enables the automated poultry orienting system to operate smoothly and in synchrony; and
a human user interface by which programmable logic control code can be entered into the program logic control system.

2. The automated poultry orienting and shackling system of claim 1 wherein the shackling conveyer has a 5 degree downward angle such that birds are gently lifted off of said shackle conveyor via a poultries connection to a shackler as the poultry moves downstream on the shackling conveyor.

3. The automated poultry orienting and shackling system of claim 1 further comprising a recycle conveyor that transfers and reintroduces unshackled poultry back to the robotic orientation system.

4. The automated poultry orienting and shackling system of claim 1 further comprising a suction tool located on a face plate of said pick robots and a prong tool located on the faceplate of said place robots and whereby said pick robots and place robots are vision guided through use of cameras directed by a pre-programmed vision logic to pick a poultry by said pick robot off of the feed conveyor, rotate said poultry into a position whereby a poultry is breast up and said place robot adjacent to said place robot receives said poultry from said pick robot and said place robot further rotates and positions said poultry such that it is perpendicular to the direction of travel of the shackling conveyor with the legs of said poultry pointed towards the shackle line.

5. The automated poultry orienting and shackling system of claim 1 wherein the shackling tool has a contour of 33 degrees from its middle point to each terminal end.

6. The automated orienting and shackling system of claim 1 wherein the shackling tool terminal end servo motors and grippers engage a poultry leg at or right behind each of the poultry tibia and fibula widest portion and said servos are rotated with the poultry legs captured therein to a desired position and the poultry legs are inserted into said shackling line.

7. An automated poultry orienting system, comprising:
a buoyancy based orientation system comprising a flume mounted on a frame that has a flared wide end for receiving poultry and a channel that narrows from the flared wide end whereby the flume is filled with water and a pumping system directs water into a low velocity high volume nozzle directed into the flared wide end of the flue and said pumping system directs water into a plurality of laminar high velocity low volume nozzles located in the narrow channel area of the flume such that all of said nozzles help promote proper head to legs position of poultry as they proceed downstream towards a wire mesh conveyor belt that deposits said poultry onto a first delivery conveyor;
an orientation determination system comprising said first delivery conveyor that directly conveys correct leg forward positioned poultry to a shackling conveyor and said orientation determination system further comprising a determiner along said first delivery conveyor length whereby the determiner is a vision camera programmed to identify if a poultry is oriented in a correct leg forward position fashion and a transfer conveyor located along the first delivery conveyor that is perpendicular to the first delivery conveyor that is actuated through communication with the vision camera if a poultry is in incorrect head first orientation and said transfer conveyor transfers an incorrectly positioned poultry onto a second delivery conveyor that has a curvature to rotate the bird into a legs first position for delivery onto a shackle conveyor;
a pass fail orientation system comprised of a vision guided robot that can remove a poultry from the shackle conveyor, rotate a poultry to a desired position on the shackle conveyor, or allow a poultry to pass without a robotic action by said vision guided robot;
a shackler frame having a plurality of overhead mounted vision guided shackling robots mounted in series above the shackle conveyor and a shackle line that is perpendicular to and directly adjacent to the shackle conveyor;
a shackling tool connected to the face plate of each of said shackling robots whereby said tool is contoured to a poultry breast and has a servo motor central axis of rotation and a first servo motor on one terminal end of the tool connected to a cylindrical body that is attached to a plurality of soft grippers and a second servo motor connected to a cylindrical bod attached to a plurality of soft grippers on the opposite terminal end of the shackling tool whereby said shackling tool is vision guided by the shackling robot;
a program logic control system that controls said buoyancy orientation system, orientation determination system, shackle conveyor, shackle line, shackling robots and shackling tool and enables the automated poultry orienting system to operate smoothly and in synchrony; and
a human user interface by which programmable logic control code can be entered into the program logic control system.

8. The automated poultry system of claim 7 wherein the shackle conveyer has a 5 degree downward angle such that birds are gently lifted off of said shackle conveyor via a poultries connection to a shackler as the poultry moves downstream on the shackling conveyor.

9. The automated poultry system of claim 7 further comprising a recycle conveyor that transfers and reintroduces unshackled poultry back to the buoyancy based orientation system.

10. The automated poultry system of claim 7 further comprising a suction tool located on a face plate of said pick robots and a prong tool located on the faceplate of said place robots and whereby said pick robots and place robots are vision guided through use of cameras directed by a pre-programmed vision logic to pick a poultry by said pick robot off of the feed conveyor, rotate said poultry into a position whereby a poultry is breast up and said place robot adjacent to said place robot receives said poultry from said pick robot and said place robot further rotates and positions said poultry such that it is perpendicular to the direction of travel of the shackling conveyor with the legs of said poultry pointed towards the shackle line.

11. The automated poultry system of claim 7 wherein the shackling tool has a contour of 33 degrees from its middle point to each terminal end.

12. The automated poultry system of claim 7 wherein the shackling tool terminal end servo motors and grippers engage a poultry leg at or right behind each of the poultry tibia and fibula widest portion and said servos are rotated with the poultry legs captured therein to a desired position and the poultry legs are inserted into said shackling line.

13. An automated poultry orienting system, comprising:
  a shackle conveyor whereby a human operator takes poultry introduced onto said shackle conveyor and places the poultry in a breast up position such that the legs are on the opposite side of the conveyor from the human operator and the poultry is perpendicular to the direction of travel of the shackle conveyor;
  a pass fail orientation system comprised of a vision guided robot that can remove a poultry from the shackle conveyor, rotate a poultry to a desired position on the shackler conveyor, or allow a poultry to pass without a robotic action by said vision guided robot;
  a shackler frame having a plurality of overhead mounted vision guided shackling robots mounted in series above the shackler conveyor and a shackle line that is perpendicular to and directly adjacent to the shackler conveyor;
  a shackling tool connected to the face plate of each of said shackling robots whereby said tool is contoured to a poultry breast and has a servo motor central axis of rotation and a first servo motor on one terminal end of the tool connected to a cylindrical body that is attached to a plurality of soft grippers and a second servo motor connected to a cylindrical bod attached to a plurality of soft grippers on the opposite terminal end of the shackling tool whereby said shackling tool is vision guided by the shackling robot;
  a program logic control system that controls said shackle conveyor, shackle line, shackling robots and shackling tool and enables the automated poultry orienting system to operate smoothly and in synchrony; and
  a human user interface by which programmable logic control code can be entered into the program logic control system.

14. The automated poultry system of claim 13 wherein the shackling conveyer has a 5 degree downward angle such that birds are gently lifted off of said shackler conveyor via a poultries connection to a shackler as the poultry moves downstream on the shackling conveyor.

15. The automated poultry system of claim 13 further comprising a recycle conveyor that transfers and reintroduces unshackled poultry back to the shackling conveyor to be re-handled by a human operator.

16. The automated poultry system of claim 13 further comprising a suction tool located on a face plate of said pick robots and a prong tool located on the faceplate of said place robots and whereby said pick robots and place robots are vision guided through use of cameras directed by a pre-programmed vision logic to pick a poultry by said pick robot off of the feed conveyor, rotate said poultry into a position whereby a poultry is breast up and said place robot adjacent to said place robot receives said poultry from said pick robot and said place robot further rotates and positions said poultry such that it is perpendicular to the direction of travel of the shackling conveyor with the legs of said poultry pointed towards the shackle line.

17. The automated poultry system of claim 13 wherein the shackling tool has a contour of 33 degrees from its middle point to each terminal end.

18. The automated poultry system of claim 13 wherein the shackling tool terminal end servo motors and grippers engage a poultry leg at or right behind each of the poultry tibia and fibula widest portion and said servos are rotated with the poultry legs captured therein to a desired position and the poultry legs are inserted into said shackling line.

* * * * *